July 7, 1953 C. GABRIELSEN 2,644,734
BEVERAGE VENDING MACHINE
Filed April 25, 1950 7 Sheets-Sheet 1

INVENTOR
CHRISTIAN GABRIELSEN
BY Henry L. Shenier
ATTORNEY

July 7, 1953

C. GABRIELSEN 2,644,734

BEVERAGE VENDING MACHINE

Filed April 25, 1950

INVENTOR
CHRISTIAN GABRIELSEN
BY
ATTORNEY

July 7, 1953

C. GABRIELSEN 2,644,734

BEVERAGE VENDING MACHINE

Filed April 25, 1950

INVENTOR
CHRISTIAN GABRIELSEN
BY
ATTORNEY

July 7, 1953

C. GABRIELSEN 2,644,734

BEVERAGE VENDING MACHINE

Filed April 25, 1950

INVENTOR
CHRISTIAN GABRIELSEN
BY Harry L. Shenier
ATTORNEY

July 7, 1953

C. GABRIELSEN 2,644,734

BEVERAGE VENDING MACHINE

Filed April 25, 1950

INVENTOR
CHRISTIAN GABRIELSEN
BY
ATTORNEY

Fig 7

July 7, 1953  C. GABRIELSEN  2,644,734
BEVERAGE VENDING MACHINE
Filed April 25, 1950  7 Sheets-Sheet 7

FIG. 8

INVENTOR
CHRISTIAN GABRIELSEN
BY Henry L. Skenier
ATTORNEY

Patented July 7, 1953

2,644,734

UNITED STATES PATENT OFFICE 2,644,734

BEVERAGE VENDING MACHINE

Christian Gabrielsen, Whippany, N. J., assignor to Rowe Manufacturing Co., Inc., Whippany, N. J., a corporation of New York Application April 25, 1950, Serial No. 158,019

18 Claims. (Cl. 312—97)

My invention relates to a beverage vending machine and more particularly to a machine for dispensing, in response to the deposit of coins, bottled or cartoned beverages such as milk, chocolate milk or carbonated beverages which are maintained in a refrigerated condition.

The beverage vending machines of the prior art have a limited capacity and are designed to vend one or several varieties of beverage of a predetermined quantity. The delivery chutes of the vending machines of the prior art are either constantly open to the atmosphere or require the opening of a large door thereby placing an increased load on the refrigerating apparatus used to maintain the beverages in a cooled condition.

One object of my invention is to provide a beverage vending machine of increased capacity.

Another object of my invention is to provide a beverage vending machine which is flexible in design and which can be used to vend cartoned or bottled beverages of various sizes and shapes.

Another object of my invention is to provide a beverage vending machine adapted to vend beverages of different kinds in which the ratio of beverages of one kind to the beverages of another kind may be varied within wide limits, in a simple, convenient and expeditious manner.

Another object of my invention is to provide a vending machine having storage levels from which containers of beverages to be vended are automatically transferred to a feed belt from which a unit of the beverage to be vended is automatically transferred to a delivery belt for transportation to the vending position.

Another object of my invention is to provide a beverage vending machine in which the delivery station is normally housed within a refrigerated container and accessible through a small door at a position remote from the feed belt so that merchandise may not be fished from the feed belt through the delivery door.

Another object of my invention is to provide a coin controlled beverage vending machine in which merchandise is automatically transferred from the storage shelf to the feed belt whenever the feed belt is depleted.

Other and further objects of my invention will appear from the following description:

In the accompanying drawings which form part of the instant specification and which are to be read in conjunction therewith and in which like reference numerals are used to indicate like parts in the various views.

In general, my invention contemplates the provision of a casing refrigerated by suitable refrigerating equipment and provided with heat insulating walls. Supported within the casing I provide a storage shelf adapted to support rows of bottles or cartons of the beverage to be vended. Adjacent each end of the storage shelf are a pair of feed belts onto which a row of merchandise from the storage shelf is adapted to be pushed. Each feed belt is adapted to support a row of merchandise. Pusher members moving in opposite directions are adapted to push merchandise from the storage shelf onto respective feed belts. One pusher member is adapted to feed merchandise of one kind, as for example, milk, and another pusher member is adapted to feed merchandise of another kind as, for example, chocolate milk. The pusher members may be adjusted along the shelf to give different areas upon which to store merchandise of the different kinds, the total area, of course, remaining constant. The feed belts are positioned near each end of the machine and are adapted to feed a carton or container of the beverage being vended to a delivery belt, of which there are two, which are positioned for movement at right angles to the direction of movement of the feed belt. The feed belt is started in response to a coin or coins of proper denomination. The delivery belt is started by the movement of the merchandise onto the delivery belt and is stopped automatically at the delivery position. The merchandise pushers act automatically to push a row of merchandise onto the feed belt whenever a feed belt becomes empty. The merchandise is adapted to be removed through a normally closed door. There are two doors, one for each kind of merchandise being vended, adjacent the center of the machine at which position the coins are adapted to be inserted into a coin register.

Figure 1:
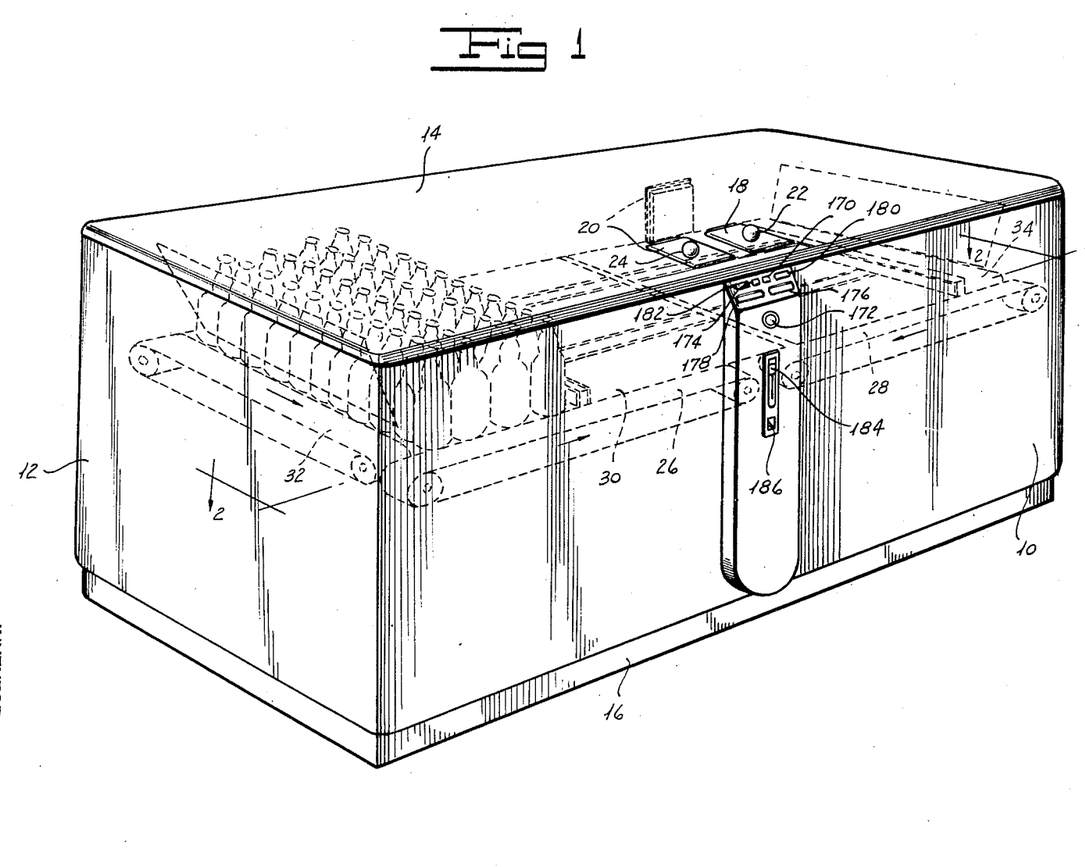
Figure 1 is a diagrammatic view of a beverage vending machine containing one embodiment of my invention.

More particularly, referring now to the drawings, a cabinet 10 of any suitable construction is provided with insulated top 14 and an insulated bottom 16. The top is provided centrally thereof with a pair of doors 18 and 20 having handles 22 and 24 so that the doors may be lifted to the dotted line position shown in Figure 1 to give access to the merchandise supported directly below the doors upon the respective delivery belts 26 and 28. The merchandise to be vended is supported upon a stationary shelf 30 which may be formed of corrugated metal or the like and carried in any suitable manner within the housing 10. The lower portion of the housing contains refrigerating apparatus of any desired type (not shown), such as a mechanical compression and expansion refrigerating system. Adjacent each end of the cabinet 10 at the level of the shelf 30 I provide feed belts 32 and 34. These feed belts are mounted upon rollers and are endless. The delivery belts 26 and 28 are positioned adjacent the vending level. These are endless belts positioned on rollers and extend in a direction at right angles to the direction of the feed belts 32 and 34. The merchandise carried by the vending shelf 30 is placed in a plurality of parallel rows indicated by the dotted lines in Figure 2. A pusher member 36 is secured to an endless sprocket chain 38 by means of clamp 40. A parallel chain 42 is positioned to the other end of pusher member 36 by means of a clamp 44. The sprocket chains 38 and 42 run the full length of the machine and span the shelf 30. One end of the chain 38 passes around an idler sprocket 46 carried by the shaft 48 at the right-hand side of the machine. The other end of the sprocket chain 38 passes around a driving sprocket wheel 50 carried by the shaft 52 at the other end of the machine. The sprocket chain 42 has its right-hand end disposed about an idler sprocket wheel 54 and its left-hand end about a driving sprocket wheel (not shown) secured to the shaft 52. A motor 56 carries a driving sprocket wheel 58 driving a transmission chain 60 disposed about a driven sprocket wheel 62 secured to the shaft 52. The arrangement is such that when the motor 56 operates the shaft 52 will be driven to drive sprocket chains 38 and 42 in the direction of the arrows in Figure 2. A second pusher member 64 is secured to a sprocket chain 66 adjacent one end by means of the clamp 68. The other end of the pusher member 64 is secured to a sprocket chain 70 by means of a clamp 72. The chain 70 has its left end disposed about an idler sprocket wheel carried loosely by the shaft 52. The right-hand end of the chain 70 is carried by a driving sprocket wheel 74 secured to the shaft 48 for rotation therewith. The left-hand end of the sprocket chain 66 is disposed about an idler sprocket wheel 76. The right-hand end of the sprocket chain 66 is secured to a sprocket wheel 78 which is secured to the shaft 48 for rotation therewith. A motor 80 drives a transmission sprocket chain 82 similar to the transmission chain 60 to drive the shaft 48 in a direction so that chains 66 and 70 will move in the direction of the arrows shown in Figure 2 to move the pusher 64 to the right.

Figure 7:
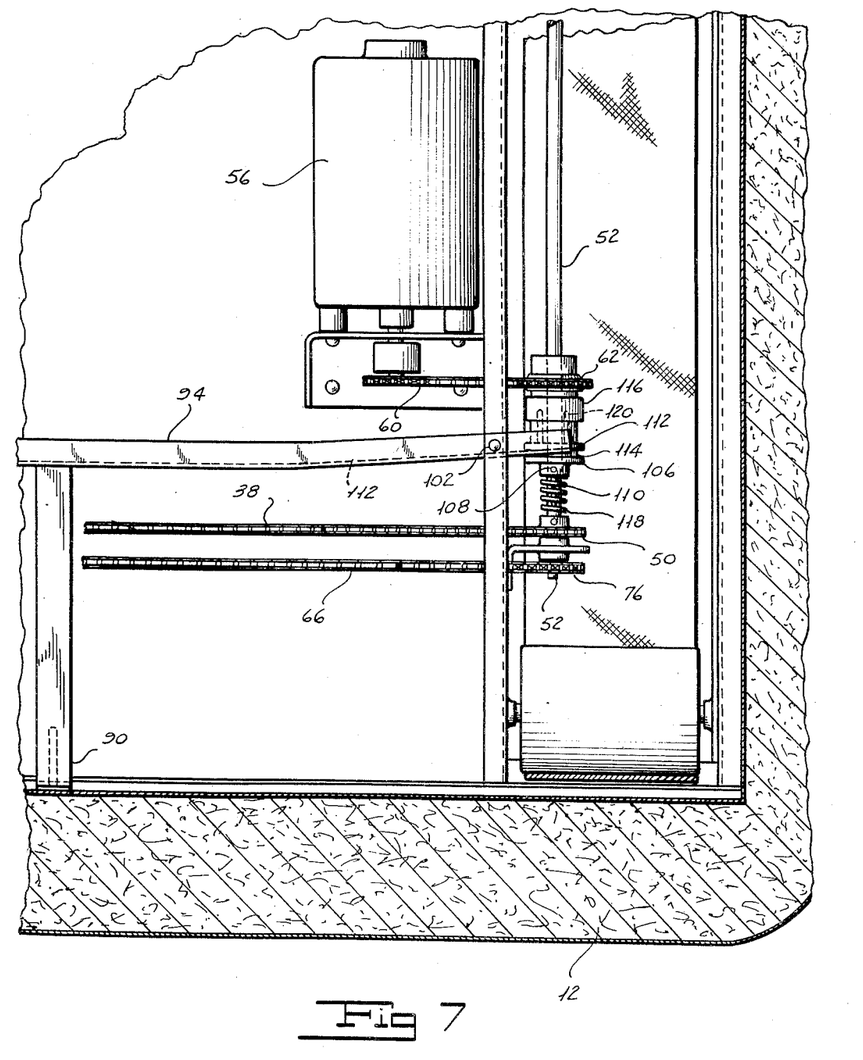
Figure 7 is a sectional view taken along the line 7—7 of Figure 4.

It will be seen that the position of the pusher 64 determines the area upon the shelf 30 to be occupied by the beverages which are moved to the right and that the position of the pusher 36 determines the area upon the shelf 30 of the beverages which are to be vended toward the left. Adjacent the rear of the machine I have provided a pair of push rods 90 and 92 adapted to contact respectively levers 94 and 96 which are pivoted to supporting members 98 and 100 about pivots 102 and 104, as can readily be seen by reference to Figure 2. The push rod 90 and the lever 94 are shown on a larger scale in Figure 7 to which reference is now had. When it is desired to position the pusher 36 initially it will be necessary to release the connection between the drive and the shaft 52 to which the sprocket wheel 50 and the corresponding sprocket wheel which drives chain 42 are attached. A clutch member 106 is secured to shaft 52 by means of pin 108 for rotation therewith. The pin 108 is lodged in a slot 110 formed in the shaft 52 so that it may slide axially thereof. The end of lever 94 is formed with a flange 112 lodged in the groove 114 formed in the clutch collar 106. The sprocket wheel 62 is secured to a bushing 116 which is loosely mounted on the shaft. A spring 118 normally urges the clutch collar 106 upwardly as in Figure 7. When the pusher member 90 is moved upwardly the lever 94 is rotated in a clockwise direction so that the flange will move the collar 106 downwardly against the action of spring 118, moving the pins 120 out of the bushing 116, thus disconnecting the drive from the shaft 52. The pusher member 36 can then be adjusted manually to any position. A similar structure is provided for the adjustment of pusher member 64 in which the bushing 115 corresponds to bushing 116 and the spring 109 corresponds to spring 110. It is thus seen that the proportion of beverages of each kind which are to be vended from the vending level to the right and to the left is determined by the position of the push members 36 and 64. Indeed, if it is desired, these push members may be separated from each other so that a variation of the number of containers of the beverages to be vended may be readily achieved.

Figure 2:
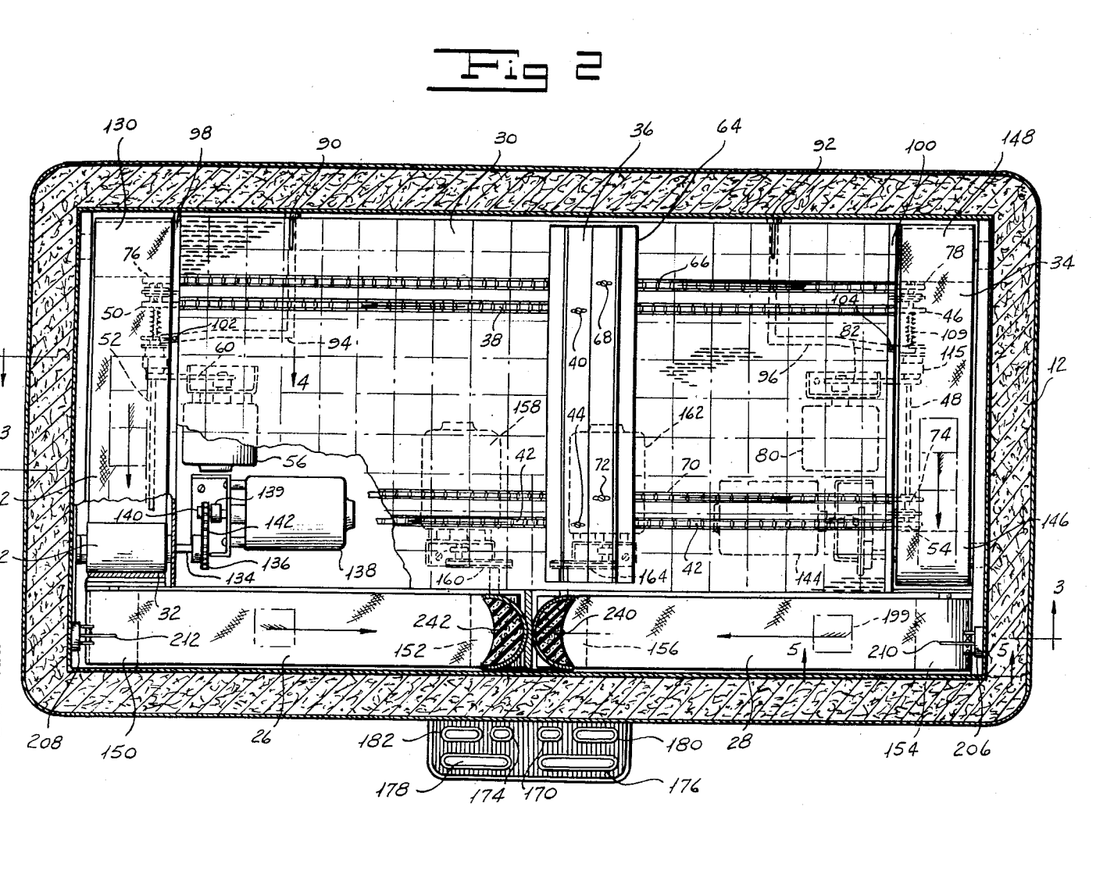
Figure 2 is a sectional plan view taken along the plane 2—2 of Figure 1.
Figure 3:
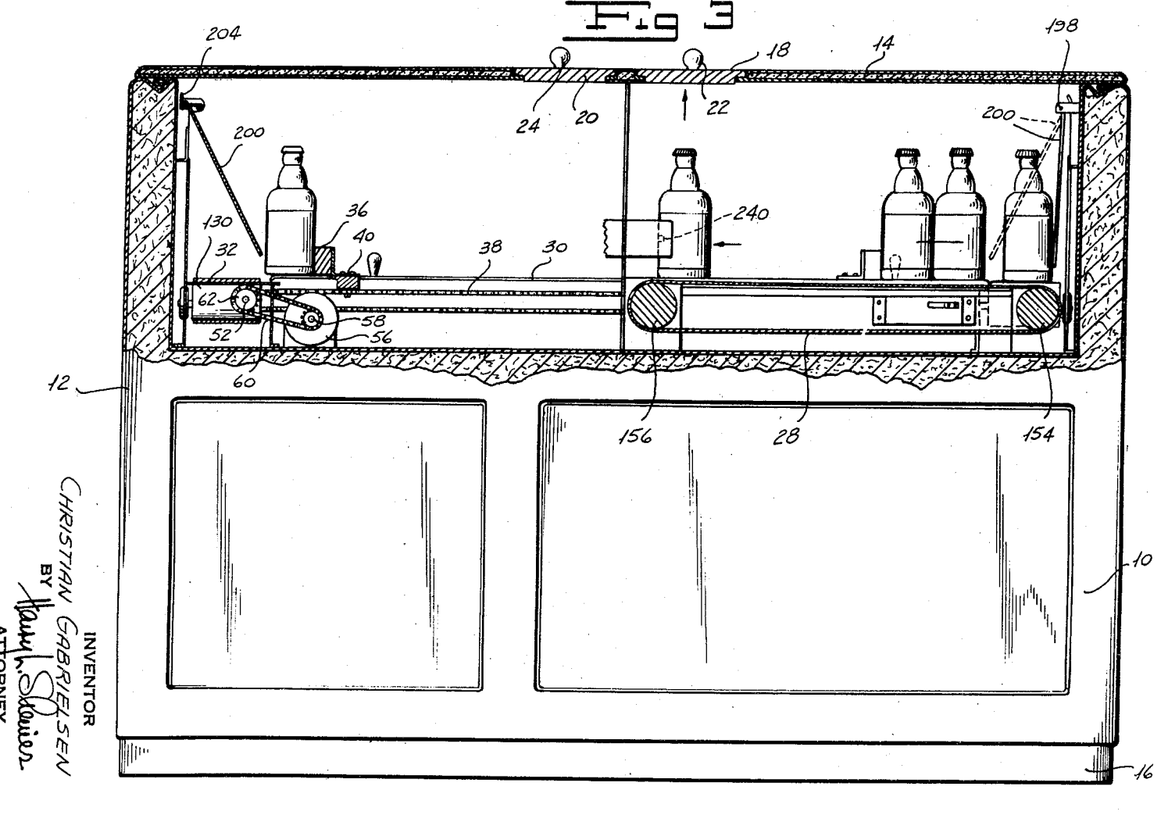
Figure 3 is a sectional elevation taken along the line 3—3 of Figure 2.

A pair of rollers 130 and 132 are mounted for rotation about shafts parallel to each other and extending in the direction of the movement of the sprocket chains 38 and 42. The roller 132 is secured to a shaft 134 which carries a sprocket wheel 136. A motor 138 is provided with a shaft 139 carrying a sprocket wheel 140. A sprocket chain 142 extends between the sprocket wheels 140 and 136 so that the motor 138 is adapted to rotate the roller 132 in a counterclockwise direction viewed from the right in Figure 2. The endless feed belt 32 is positioned around rollers 130 and 132 and the upper surface thereof is adapted to move in the direction of the arrow in Figure 2. The upper surface of the feed belt, furthermore, is positioned closely adjacent to the edge of the shelf 30. In a similar manner a motor 144 is adapted to rotate the roller 146 in a clockwise direction viewed from the left. A roller 148 is mounted spaced from and parallel to the roller 146 and these rollers, positioned to the right of the shelf 30, as viewed in Figure 2, support the feed belt 34. The upper surface of the feed belt is adapted to move downwardly as shown by the arrow in Figure 2 and is positioned on a level with and closely adjacent to the right-hand edge of the shelf 30. A roller or drum 150 is positioned with its axis extending at right angles to the axis of the shaft 134, that is, parallel to the direction of motion of the feed belt 32. A similar roller 152 is positioned near the center of the machine for rotation around an axis parallel to the axis of roller 150. An endless delivery belt 26 is carried by the rollers the upper surface of which is substantially coplanar with the upper surface of feed belt 32. A roller 154 analogous to roller 150 and a roller 156 analogous to roller 152 are adapted to mount a second delivery belt 28. The roller 152 is driven from motor 158 and sprocket chain 160 to rotate in a clockwise direction as viewed from the front so that the upper surface of the delivery belt 26 will move in the direction of the arrow shown in Figure 2. The roller 156 is driven from the motor 162 and sprocket chain 164 to rotate in a counterclockwise direction viewed from the front so as to rotate the upper surface of the delivery belt 28, which is coplanar with the upper surface of the feed belt 34, in the direction of the arrow as shown in Figure 2. The drive for the feed belt 34 is shown in greater detail in Figure 6 in which the motor 144 carries a sprocket wheel 143. The roller 146 is carried by shaft 145 to which is secured a sprocket wheel 147. A sprocket chain 149 extends between sprocket wheel 143 and sprocket wheel 147 to rotate the roller 146 in a clockwise direction as viewed from the left. The motor 144 is controlled by a push button 170 which is made effective after a coin is placed into the coin slot 172 shown in Figure 1. The motor 138 is controlled by a push button 174 likewise rendered effective by the deposit of a coin. By passing either push button 174 or 170 the purchaser makes a selection of a beverage from either the right-hand or the left-hand side of the machine, as may be determined by reference to a legend visible through window 176 or window 178. If the right-hand side of the machine is depleted of beverages, an empty light is visible through window 180. If the left-hand side of the machine is depleted of beverages, an empty light is visible through window 182. If a purchaser changes his mind after depositing a coin he may have the coin returned by operating the coin return lever 184 which will return the coin to the return coin opening 186.

The function of motors 56 and 80 is to operate the respective pushers 36 and 64 through the sprocket chain drives already described. The function of the pushers is to transfer a row of bottles or containers of beverage from the shelf 30 to the upper surface of a feed belt such as feed belt 32 shown in Figure 4. The motor 138 is controlled by the microswitch 190 operated through switch arm 192 through a link 194 connected to the end of a crank 196. The crank 196 is secured to a shaft 198 for rotation therewith. The shaft 198 is mounted adjacent the left-hand side of the machine above the tops of the containers such as bottles 199 of beverage. A flap 200 is secured to the shaft 198 by means of plate 202 which also carries a counterweight 204. The function of the counterweight is to rotate the flap 200 so that its lower edge moves toward the shelf 30. For example, in Figure 4 the flap 200 is shown contacting the row of bottles 199. This rotates the shaft 198 in a clockwise direction as viewed in Figures 4 and 5 and raises the link 194 to actuate the switch arm 192 to energize the motor 56, thus causing pusher 36 to push the row of bottles onto the feed belt 32 moving the flap 200 to its right-hand dotted line position indicated by the reference numeral 201 in which position the link 194 moves downwardly moving the switch arm 192 to interrupt the circuit through motor 56. If no bottles 199 are on the shelf 30 the counterweight 204 will rotate the flap 200 to the dotted line position indicated by the reference numeral 203. To achieve the position the link 194 must move upwardly a little further. This interrupts the motor circuit and makes a circuit to energize the empty light, as will be described in greater detail hereinafter. A switch box 206 is positioned adjacent the right-hand side of the machine and a switch box 208 is positioned adjacent the left-hand side of the machine. The switch box 206 carries an arm 210 in the path of containers being fed by the feed belt 34. The switch box 208 carries an arm 212 in the path of containers being fed by the feed belt 32. The circuit through motor 144 can only be made when the switch arm 210 is in the position shown in Figure 6. The circuit through motor 138 can only be made when switch arm 212 is in an analogous position. As a container is fed by feed belt 34 onto the delivery belt 28 it will strike switch arm 210 and interrupt the feeding of containers by means of the feed belt 34. This ensures that only one container will pass onto the delivery belt, it being understood that the position of the switch arm is such as to permit one and only one container to pass to the delivery belt.

Figures 5, 6:
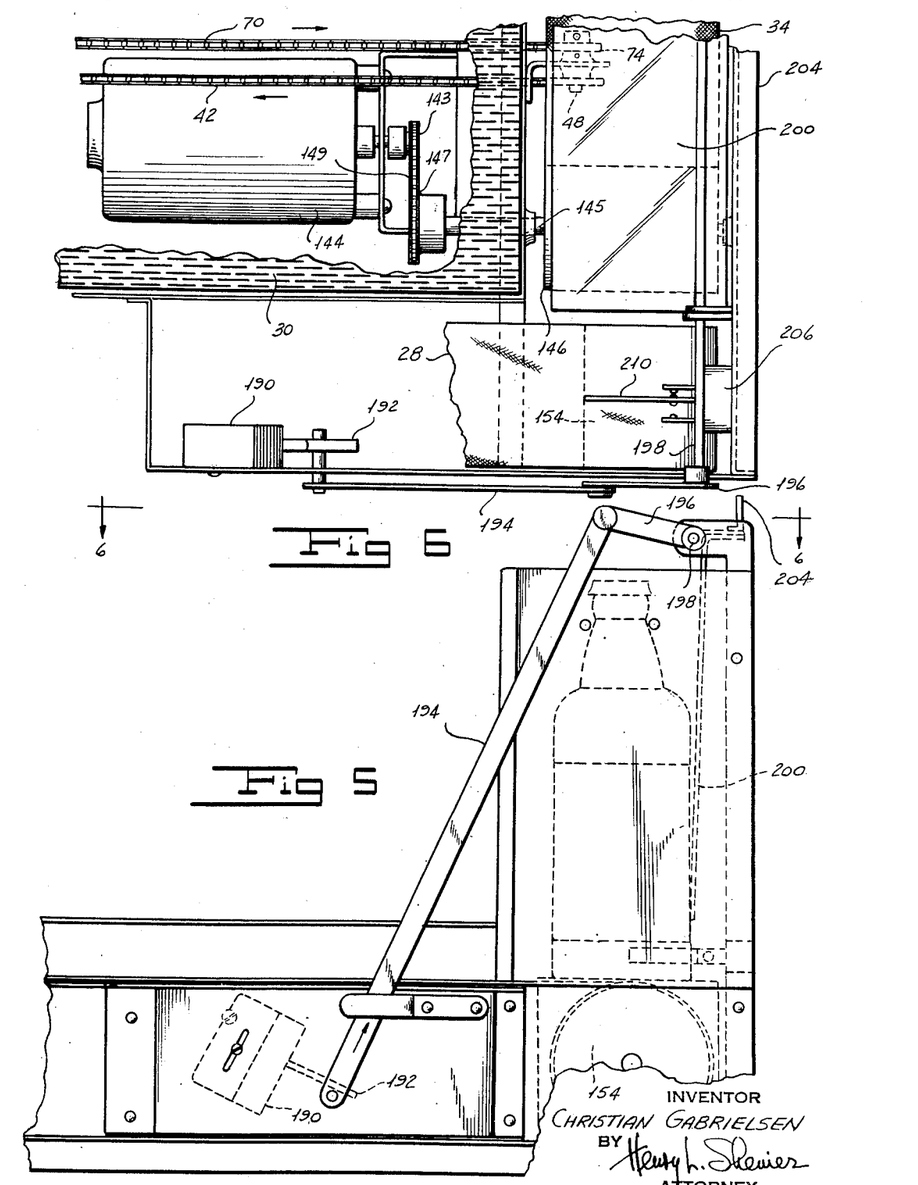
Figure 5 is a fragmentary sectional elevation taken along the line 5—5 of Figure 2.
Figure 6 is a plan view taken along the line 6—6 of Figure 5.

As the switch arm moves downwardly as viewed in Figure 6 it will start the operation of the motor 162 and thus cause the delivery belt to carry the container in the direction of the arrow shown in Figure 2. A switch plunger 240 is adapted to be contacted by a container on the delivery belt to stop the operation of motor 162. At this time the container will be beneath the door 18 and the handle 22 may be used to open the door to remove the delivered container. In a similar fashion the delivery belt 26 is adapted to deliver its kind of beverage until the container contacts the switch button 242 which stops the actuation of the motor 158.

Figure 8:
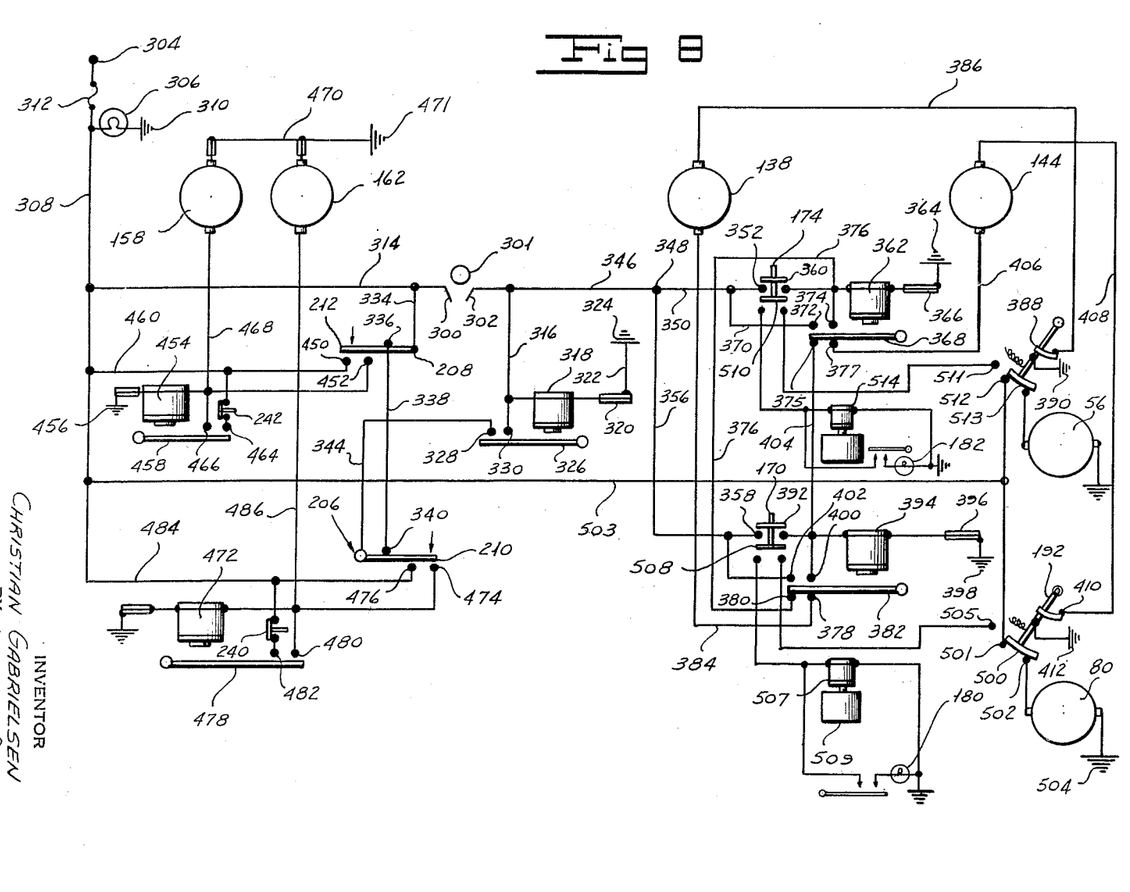
Figure 8 is a diagrammatic view showing the electrical control circuits involved.

Referring now to Figure 8, let us say that a coin 301 which has been inserted through the coin slot 172 falls onto a money shelf (not shown) so that it can be accepted as soon as the feed belt operates and can be returned by operating the coin return. In falling to the money shelf the coin wipes by a pair of brushes 300 and 302. The system is energized from a power source connected to binding post 304 operating to ground. A light 306 energized from the hot wire 308 to ground 310 indicates that power is connected to the machine. A fuse 312 protects the machine against short circuits. As the coin passes by the brushes 300 and 302 current will flow momentarily from the hot wire 308 through the conductor 314, through the conductor 316, through the winding of relay 318, through thermostatic protective element 320, through conductor 322 to ground 324. If a coin should become stuck across brushes 300 and 302 or if it be attempted to short circuit the brushes, the thermostatic protective element 320 will open the circuit through the relay 318. As soon as the relay 318 operates, its armature 326 will complete the circuit across contact points 328 and 330 so that a current will then flow through conductor 334, through the arm 212 of switch box 208, to contact point 336, through conductor 338, to contact point 340 of switch box 206, through arm 210, through conductor 344, to contact point 328, through the armature 326, to contact point 330 and thence through the holding relay 318 to ground, thus maintaining the circuit in operative condition even though the coin passes the brushes 300 and 302 only momentarily. Current will also flow from contact point 330 through conductor 316, through conductor 346, to binding post 348, thence through conductor 350 to contact point 352 and through parallel conductor 356 to contact point 358. The push button 174 for controlling the feed motor 138 is pressed if a purchaser desires a beverage from the left-hand side of the machine. The push button 170 controlling the feed motor 144 is pressed if a purchaser desires a beverage from the right-hand side of the machine. Let us assume that a purchaser presses button 174. When this occurs the upper contact 360 completes a circuit through relay 362 to ground 364 through thermostatic protective element 366. This attracts the armature 368 of the relay 362 and completes a circuit through conductor 370 to contact point 372, to contact point 374 and ensures that relay 362 will be held in an energized condition even though the button 174 has been pressed only momentarily. At the same time the upward motion of the armature 368 interrupts the circuit across contact points 375 and 377 to ensure that the circuit through the right-hand feed motor 144 is interrupted. This avoids any possibility of a purchaser obtaining two beverages for one coin by pressing both push buttons 174 and 170. The energization of contact point 374 permits current to flow through conductor 376 to contact point 380, across armature 382 to contact point 378, thence through conductor 384 to feed motor 138, through conductor 386 to switch segment 388, to ground 390.

If instead of pressing button 174 a purchaser pressed button 170, current would flow through conductor 356, across the contact 392 of the push button 170, through holding relay 394, through thermostatic protective element 396, to ground 398, attracting armature 382. The upward motion of armature 382 interrupts the circuit across contact points 380 and 378 to ensure that the feed motor 138 cannot operate. At the same time the armature 382 completes the circuit across contact points 400 and 402 so that current will now flow through the holding relay 394 by way of the circuit across these contact points to ensure that contact point 400 will be energized even though push button 170 is but momentarily operated. Current will also flow from contact point 400 through conductor 404 to the contact point 375, across armature 368 to contact point 377 and thence through conductor 406 through the feed motor 144, through conductor 408 to the switch segment 410 to ground 412, thus operating the feed motor 144.

Let us assume that button 174 was pressed to select a beverage from the left-hand side of the machine and feed motor 138 has been set in operation as described. The operation of the feed motor 138 will move the feed belt 32 to transfer a container of beverage onto the delivery belt 26. The feed motor 138 will continue to run until the leading edge of the container strikes switch arm 212, moving it in the direction of the arrow shown in Figure 8. The initial movement of the arm 212 interrupts the holding circuit through the relay winding 318 so that the armature 326 will drop, breaking the circuit through the holding relay 362 and through the feed motor 138, thereby stopping the motor.

If the motor 144 operating the feed belt on the right-hand side of the machine were employed, the container would strike the arm 210 and interrupt the circuit through holding relay 318 across contact point 349 and the arm 210 so that the holding relay 394 and the feed motor 144 would be deenergized.

The movement of the arm 212 downwardly makes the circuit across contact points 450 and 452 so that current will flow through the holding relay winding 454 to ground 456, energizing the relay and attracting the armature 458. When the armature is attracted current will flow through conductor 460 across normally closed interrupter switch 242 to contact point 464, to contact point 466 and through the relay winding 454, maintaining it energized. Current will also flow from the contact point 466 through conductor 468, through the delivery motor 158 through conductor 470 to ground 471. The actuation of the motor 158 will move the container toward the interrupter switch 242. When the container strikes this interrupter switch the relay winding 454 will be de-energized and the circuit through the delivery motor 158 broken. A container moving along feed belt 34 on the right-hand side of the machine will strike the arm 210 and energize the relay 472 across contact points 474 and 476. When the relay 472 is energized the armature 478 will make the circuit across contact points 480 and 482, thereby enabling the relay 472 to remain energized through conductor 484 by way of the interrupter switch 240. At the same time the circuit through motor 162 to ground 471 will be completed through conductor 486. When the delivery belt has brought the container to the proper position underneath the door 18, the interrupter switch 240 will de-energize the relay 472 and the delivery motor 162.

Figure 4:
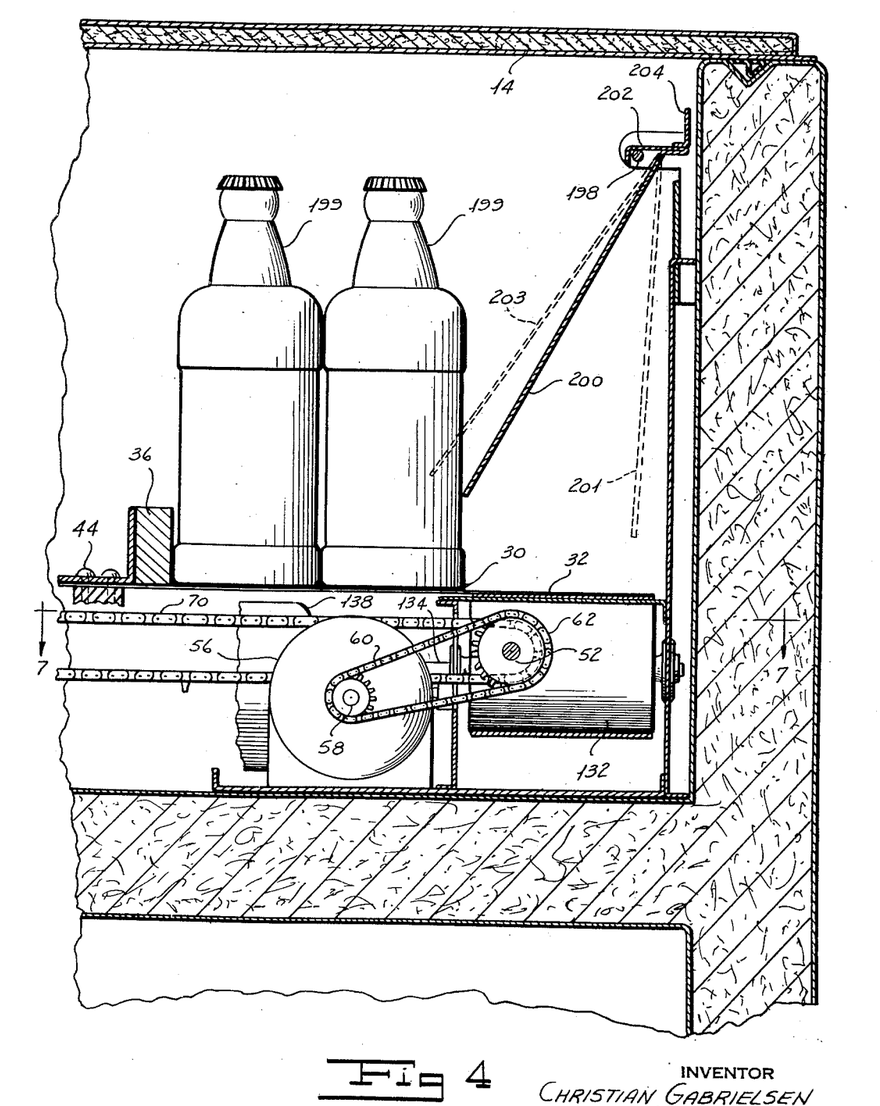
Figure 4 is a fragmentary sectional elevation taken along the line 4—4 of Figure 2.

Let us now assume that the last container carried by the feed belt 34 has passed onto the delivery belt so that the flap 200 at the right-hand side of the machine moves upwardly to the position shown in Figure 4. When this occurs the arm 192 of the switch housing 190 positioned at the right-hand side of the machine will move in a clockwise direction as viewed in Figure 8, so that the switch sector 500, which is insulated from arm 192, will complete the circuit across contact points 501 and 502, thus energizing the motor 80 from conductor 503 to ground 504. The motor 80 will run until the circuit across the contact points 501 and 502 is broken, which will occur when the motor 80 has driven the pusher 64 to bring a row of containers 199 into position on the feed belt 34 associated with the right-hand side of the machine, thus moving the flap 200 to the dotted line position shown in Figure 5. When the flap reaches this position the storage motor 80 will stop and another row of containers is in a position to be fed onto the delivery belt in response to coins and customer's selection. If there are no containers of beverage left upon the shelf, the flap 200 will move inwardly to a position similar to that shown by the dotted line position 203 in Figure 4. When this occurs the sector 500 will complete the circuit across contact points 501 and 505. It will also be observed that the switch arm 192 will move from the sector 410 so that when the button 170 is pressed the feed motor 144 cannot operate since it will be disconnected from the ground 412. On the other hand, the relay 507 will be operated by the lower contact 508 of the button 170. This will energize the coin return mechanism indicated by the reference numeral 509 and illuminate the empty signal light 180 so that the purchaser pressing button 170 when the storage shelf is empty will receive his money through the coin return and be informed that the right-hand side of the machine is empty. A similar arrangement operates the motor 56 in which the switch arm associated with the left-hand side of the machine and operated by the movement of the flap 200 will energize the storage motor 56. The push button 174 carries a lower contact 510 adapted, when the circuit is made across contact points 511 and 512 by the sector 513, which is insulated from arm 388, to operate the coin return relay 514 and energize the empty signal light 182 for the left-hand side of the machine, upon the pressing of the button 174, in a manner similar to the operation of the push button 170 when the right-hand side of the machine is empty, as described. It is understood, of course, that when the left-hand side of the machine becomes depleted of merchandise and the sector 513 makes a circuit across contact points 511 and 512 the circuit through the feed motor 138 is broken by interrupting its connection to ground through the sector 388, so that the feed motor cannot be operated when the storage shelf is depleted of merchandise.

It will be seen that I have accomplished the objects of my invention. I have provided a beverage vending machine of increased capacity for vending one or several varieties of a beverage in predetermined quantities in which the proportion of beverages of one kind with respect to beverages of another kind may be varied within wide limits in a simple, convenient and expeditious manner. I have provided a beverage vending machine which may be used to vend cartoned or bottled beverages of various sizes and shapes. My vending machine transfers beverages automatically from a storage level to a feed belt and from the feed belt to a delivery belt, which in turn transfers the beverage to a vending position underneath a small closed door from which the delivered container of beverage may be removed. In my vending machine the delivery openings are small and normally closed so that the refrigeration load on the machine is reduced. The delivery position is remote from the feed belt and isolated from the storage level so that merchandise may not be fished from the machine through the delivery door. The feed belt is automatically replenished whenever it becomes empty and a container of beverage is automatically transferred to a delivery belt upon purchase, which in turn automatically delivers the purchased container to the vending position. Whenever the storage level is empty the feed belt cannot be operated. The delivery belt is operated automatically only upon the delivery of merchandise to it.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A vending machine including in combination a housing, a horizontally positioned storage shelf carried within said housing for supporting a plurality of articles to be vended, a pair of rollers carried adjacent one end of said housing, an endless feed belt positioned on said rollers with its upper surface coplaner with said storage shelf, a second pair of rollers positioned within said housing, an endless delivery belt carried by said rollers and extending at right angles to said feed belt said delivery belt being adapted to receive articles being vended from said feed belt, a pusher for transferring a plurality of articles from said storage shelf to said feed belt, a coin-controlled means for moving said feed belt to deliver an article therefrom to said delivery belt, means responsive to the movement of an article from said feed belt to said delivery belt for stopping the movement of said feed belt and for initiating the movement of said delivery belt and means responsive to the movement of an article being carried by the delivery belt to a predetermined vending position for stopping the movement of said delivery belt.

2. A vending machine as in claim 1, including means responsive to the movement of the last article from the feed belt to the delivery belt for initiating the movement of said pusher to transfer a plurality of articles from said storage shelf to said feed belt and means responsive to the movement of the articles onto the feed belt for stopping the movement of said pusher.

3. A vending machine as in claim 1, including a motor, means for coupling said motor to said pusher, means responsive to the movement of the last article from said feed belt to said delivery belt for initiating the action of said motor, means responsive to the movement of articles from the storage shelf to the feed belt for stopping the action of the motor and means for uncoupling said pusher from said motor whereby to enable the position of the pusher to be adjusted.

4. A vending machine as in claim 1, in which said housing is provided with a normally closed door, said door being positioned adjacent the predetermined vending position.

5. A vending machine as in claim 1, in which said coin-controlled means for moving said feed belt comprises a motor, means for coupling the output of said motor to one of said rollers, and coin-controlled means for energizing said motor.

6. A vending machine as in claim 1 in which said means responsive to the movement of the article from the feed belt to the delivery belt for stopping the movement of the feed belt and for initiating the movement of the delivery belt includes a motor, means for coupling the output of said motor to drive said delivery belt, a normally closed switch, a normally open switch, switch operating means adapted to open said normally closed switch and close said normally open switch, said normally open switch adapted to control the initiation of said motor.

7. A vending machine as in claim 1, including a motor, means for coupling said motor to said pusher, article contacting means, means for pivoting said article contacting means adjacent the feed belt, means for biasing said article contacting means to contact articles upon said feed belt, a switch, a coupling means between said article contacting means and said switch, the construction being such that when the last article on said feed belt is fed to the delivery belt said article contacting means will move toward said storage shelf to operate said switch to initiate the action of said motor to actuate said pusher to replenish said feed belt.

8. A vending machine as in claim 1, including in combination an article contacting means, means for pivoting said article contacting means from said housing adjacent the feed belt, means for biasing said article contacting means to pivot toward said storage shelf, a multiposition switch, means interconnecting said article contacting means and said multiposition switch, a motor for said pusher, a second motor for said feed belt, the construction being such that said article contacting member will contact articles on said feed belt to position said multiposition switch in a position de-energizing said pusher motor, and upon the feeding of the last article from said feed belt said article contacting member will pivot to contact articles on said storage shelf and position said multiposition switch to energize said pusher motor to replenish said feed belt with articles to be vended and upon the depletion of articles upon said storage shelf will swing to a position to stop said pusher motor and to de-energize said feed belt motor.

9. A vending machine including in combination a housing, a storage shelf positioned in said housing, a first feed belt having its upper surface coplanar with the stroage shelf mounted for movement adjacent one end of the housing, a second feed belt having its upper surface coplanar with the storage shelf mounted for movement adjacent the other end of the housing, a first delivery belt mounted for movement at right angles to the direction of movement of the first feed belt adapted to receive articles from the first feed belt, a second delivery belt mounted for movement at right angles to the direction of movement of the second feed belt adapted to receive articles from the second feed belt, a pair of pushers positioned between articles on said storage shelf, means for adjusting the position of said pushers, coin-controlled means for selectively moving said feed belts, means responsive to the movement of the last article from a respective feed belt for operating a respective pusher to move articles from the storage shelf to the respective feed belt, means responsive to the movement of articles from the storage shelf to the respective feed belt for rendering said respective pusher operating means inoperative, means responsive to the movement of an article from a respective feed belt to its respective delivery belt for stopping the movement of the respective feed belt and initiating the movement of the respective delivery belt and means responsive to the movement of an article carried by the respective delivery belt to a predetermined vending position for stopping the operation of the delivery belt.

10. A vending machine as in claim 9, in which said predetermined vending position for each of said delivery belts is adjacent the center of the machine.

11. A vending machine as in claim 9, in which said housing is provided with a pair of normally closed, manually openable, doors positioned adjacent the respective vending positions.

12. A vending machine as in claim 9, including means to vary the position of the pushers both with respect to each other and with respect to said storage shelf whereby to proportion the quantity of articles upon said storage shelf to be serviced by respective pushers.

13. A vending machine as in claim 9, including in combination a first pair of motors for operating said pushers, a second pair of motors for operating said feed belts and a third pair of motors for operating said delivery belts, a control circuit for said motors comprising a normally de-energized holding relay, a coin register adapted to energize said relay upon the deposit of a coin of predetermined denomination, means for energizing the feed belt motor circuit upon the energization of said holding relay, a pair of selectively operable push buttons adapted to energize respective feed belt motors and a switch operable by the delivery of merchandise from the feed belt to the delivery belt for de-energizing said holding relay and for stopping said feed belt motor.

14. A vending machine as in claim 9, including in combination a first pair of motors for operating said pushers, a second pair of motors for operating said feed belts and a third pair of motors for operating said delivery belts, a control circuit for said motors comprising a source of potential, a normally de-energized holding relay adapted to energize the feed belt motor circuits, coin switch means for energizing said holding relay to energize said feed belt motor circuits, a pair of selectively operable push buttons, a pair of normally de-energized holding relays associated with said push buttons, an armature associated with each relay for completing a holding circuit through the same and for breaking the motor circuit associated with the other push button whereby to prevent the operation of both feed belt motors by the pressing of both push buttons.

15. A vending machine as in claim 9, including in combination a first pair of motors for operating said pushers, a second pair of motors for operating said feed belts and a third pair of motors for operating said delivery belts, a control circuit for said motors comprising a source of potential, a normally de-energized holding relay, coin switch means for energizing said relay to energize the feed belt motor circuits, a pair of relays, push buttons associated with said relays adapted to be selectively operable to energize the respective feed belt motor associated therewith and switch means responsive to the movement of an article from the feed belt to the delivery belt for de-energizing said feed belt motor and energizing said delivery belt motor.

16. A vending machine as in claim 9, including in combination a first pair of motors for operating said pushers, a second pair of motors for operating said feed belts and a third pair of motors for operating said delivery belts, a control circuit for said motors comprising a source of potential, a normally deenergized holding relay, coin switch means for energizing said relay to energize the feed belt motor circuits, a pair of relays, push buttons associated with said relays adapted to be selectively operable to energize the respective feed belt motor associated therewith, switch means responsive to the movement of an article from the feed belt to the delivery belt for de-energizing said feed belt motor and energizing said delivery belt motor, and switch means responsive to the movement of an article to a predetermined vending position for de-energizing said delivery belt motor.

17. A vending machine as in claim 9, including in combination a first pair of motors for operating said pushers, a second pair of motors for operating said feed belts and a third pair of motors for operating said delivery belts, a control circuit for said motors comprising a pair of push buttons adapted to be selectively operated to energize one of said feed belt motors, switch means operable by the movement of an article from the feed belt to the delivery belt for stopping the feed belt motor and energizing a respective delivery belt motor, switch means operable by the movement of an article to a predetermined vending position for stopping the delivery belt motor, and switch means operable by the movement of the last article from the feed belt to the delivery belt for energizing a pusher motor including switch means operable by the depletion of articles from the storage shelf for de-energizing the feed belt motor circuit and said pusher motor circuit.

18. A vending machine as in claim 9, including in combination a first pair of motors for operating said pushers, a second pair of motors for operating said feed belts and a third pair of motors for operating said delivery belts, a control circuit for said motors comprising a pair of push buttons adapted to be selectively operated to energize one of said feed belt motors, switch means operable by the movement of an article from the feed belt to the delivery belt for stopping the feed belt motor and energizing a respective delivery belt motor, switch means operable by the movement of an article to a predetermined vending position for stopping the delivery belt motor, switch means operable by the movement of the last article from the feed belt to the delivery belt for energizing a pusher motor including switch means operable by the depletion of articles from the storage shelf for de-energizing the feed belt motor circuit and said pusher motor circuit, and switch means for energizing a coin return relay when said storage shelf is empty whereby upon the operation of the push button associated with the empty storage shelf the deposited coin will be returned.

CHRISTIAN GABRIELSEN.

References Cited in the file of this patent

UNITED STATES PATENTS

| Number | Name | Date |
|---|---|---|
| Re. 23,103 | Newcomer | Apr. 26, 1949 |
| 1,457,300 | Cohen | June 5, 1923 |
| 2,452,837 | Colbert | Nov. 2, 1948 |